United States Patent
Turalba

(10) Patent No.: US 12,106,672 B2
(45) Date of Patent: Oct. 1, 2024

(54) AIRCRAFT SENSOR SYSTEM SYNCHRONIZATION

(71) Applicant: Aurora Flight Sciences Corporation, Manassas, VA (US)

(72) Inventor: Jose Antonio L. Turalba, Cambridge, MA (US)

(73) Assignee: Aurora Flight Sciences Corporation, a Subsidiary of The Boeing Company, Manassas, VA (US)

( * ) Notice: Subject to any disclaimer, the term of this patent is extended or adjusted under 35 U.S.C. 154(b) by 364 days.

(21) Appl. No.: 17/457,621

(22) Filed: Dec. 3, 2021

(65) Prior Publication Data

US 2022/0189318 A1 Jun. 16, 2022

Related U.S. Application Data

(60) Provisional application No. 63/126,450, filed on Dec. 16, 2020.

(51) Int. Cl.
*G08G 5/00* (2006.01)
*B64C 27/00* (2006.01)
(Continued)

(52) U.S. Cl.
CPC .......... *G08G 5/0043* (2013.01); *B64C 27/00* (2013.01); *B64C 39/024* (2013.01); *B64G 1/00* (2013.01);
(Continued)

(58) Field of Classification Search
CPC .... G08G 5/045; G08G 5/0086; G08G 5/0078; G08G 5/0021; G08G 5/0008; G08G 5/0039; G08G 5/0091; G08G 5/04; G08G 5/003; G08G 5/0043; G08G 5/065; G08G 5/0013; G08G 5/0069; G08G 5/025;
(Continued)

(56) References Cited

U.S. PATENT DOCUMENTS

| | | | |
|---|---|---|---|
| 2,720,029 A * | 10/1955 | Eliel | G01C 11/02 33/1 A |
| 10,295,365 B2 | 5/2019 | Scherer et al. | |
| 11,423,791 B2 * | 8/2022 | Omari | G05D 1/0202 |

OTHER PUBLICATIONS

Zhang et al., "Distributed Very Large Scale Bundle Adjustment by Global Camera Consensus," 2017 IEEE Conference on Computer Vision (ICCV), Oct. 2017, pp. 29-38.
(Continued)

*Primary Examiner* — Maceeh Anwari
*Assistant Examiner* — Aarron E Santos
(74) *Attorney, Agent, or Firm* — Yee & Associates, P.C.

(57) ABSTRACT

A method, apparatus, system, and computer program product for operating an aerial imaging system. A first altitude of a first aircraft is determined, by a computer system, using first images of a key point generated by the first aircraft during a flight and stereo depth triangulation. The first altitude is compared with a second altitude of a second aircraft determined by the second aircraft, by the computer system, to form a comparison. An offset between the first altitude and the second altitude is determined, by the computer system, using the comparison. At least one of the first altitude or the second altitude is adjusted based on the offset. A plurality of images of a region from the first aircraft at the first altitude and from the second aircraft at the second altitude is obtained.

21 Claims, 10 Drawing Sheets

(51) Int. Cl.
  *B64C 39/02* (2023.01)
  *B64G 1/00* (2006.01)
  *G05D 1/00* (2024.01)
  *G06T 7/593* (2017.01)

(52) U.S. Cl.
  CPC .............. *G05D 1/042* (2013.01); *G06T 7/593* (2017.01); *G08G 5/003* (2013.01); *G06T 2207/10012* (2013.01); *G06T 2207/10032* (2013.01)

(58) Field of Classification Search
  CPC ...... G08G 1/161; G08G 1/166; G08G 5/0047; G08G 5/0052; G08G 5/0004; G06T 2207/10032; G06T 2207/30244; G06T 2200/04; G06T 2200/08; G06T 2207/10028; G06T 2207/30204; G06T 2207/30208; G06T 7/337; G06T 7/593; G06T 7/74; G06T 2207/10012; G06T 7/70; G06T 17/05; G06T 2207/30252; G06T 11/60; G06T 17/00; G06T 2207/30241; G06T 7/30; G06T 7/33; G06T 7/521; G06T 2207/10016; G06T 2207/30212; G06T 7/277; G06T 2200/24; G06T 2207/30196; G06T 2207/30232; G06T 7/00; G06T 7/292; G06T 2207/10021; G06T 2207/20021; G06T 2207/20076; G06T 2207/20084; G06T 7/246; G06T 7/248; G06T 7/269; G06T 7/73; B64C 39/024; B64C 13/18; B64C 29/0033; B64C 39/04; B64C 39/12; B64C 13/16; B64C 3/385; B64C 5/04; B64C 5/16; B64C 13/08; B64C 13/22; B64C 25/68; B64C 27/00; B64C 27/28; B64C 3/32; B64C 37/00; B64C 3/00; B64C 39/08; B64C 13/02; B64C 11/001; B64C 29/0025; B64C 29/0083; B64C 39/02; B64C 1/26; B64C 2003/143; B64C 2211/00; B64C 27/08; B64C 27/12; B64C 11/32; B64C 11/48; B64C 11/50; B64C 27/26; B64C 3/38; B64C 19/00; B64C 2039/105; B64C 27/30; B64C 27/32; B64C 27/46; B64C 27/473; B64C 27/50; B64C 29/0016; B64C 3/52; B64C 39/10; B64C 9/10; B64C 1/068; B64C 1/16; B64C 11/305; B64C 11/46; B64C 13/04; B64C 13/24; B64C 2027/7205; B64C 21/00; B64C 21/01; B64C 21/06; B64C 2220/00; B64C 25/32; B64C 27/52; B64C 27/57; B64C 27/58; B64C 29/02; B64C 39/022; B64C 9/04; G05D 1/101; G05D 1/0088; G05D 1/0676; G05D 1/0016; G05D 1/104; G05D 1/0094; G05D 1/12; G05D 1/042; G05D 1/106; G05D 1/0808; G05D 1/0825; G05D 1/102; G05D 1/0202; G05D 1/0055; G05D 1/0287; G05D 1/0816; G05D 1/0038; G05D 1/0044; G05D 1/0077; G05D 1/10; G05D 1/0022; G05D 1/0033; G05D 1/0204; G05D 1/0276; G05D 1/1064; G05D 1/0061; G05D 1/0066; G05D 1/0653
  See application file for complete search history.

(56) References Cited

OTHER PUBLICATIONS

Extended European Search Report (EESR) dated May 17, 2022, regarding Application No. EP 21214123, 11 pages.

\* cited by examiner

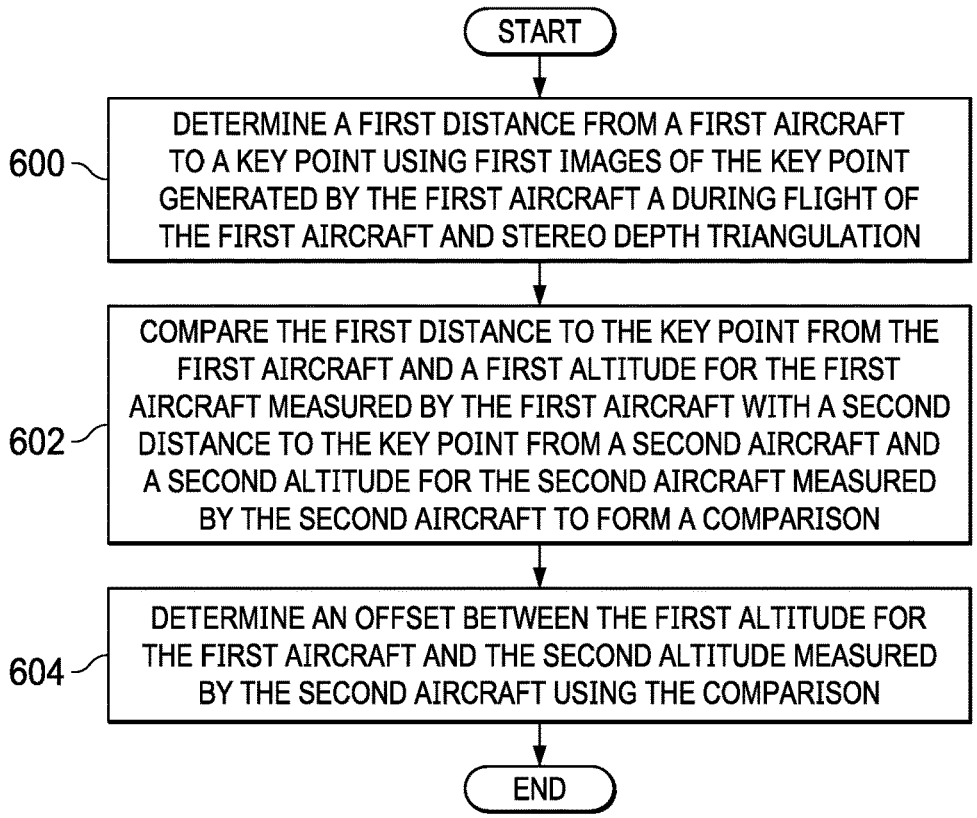
FIG. 6
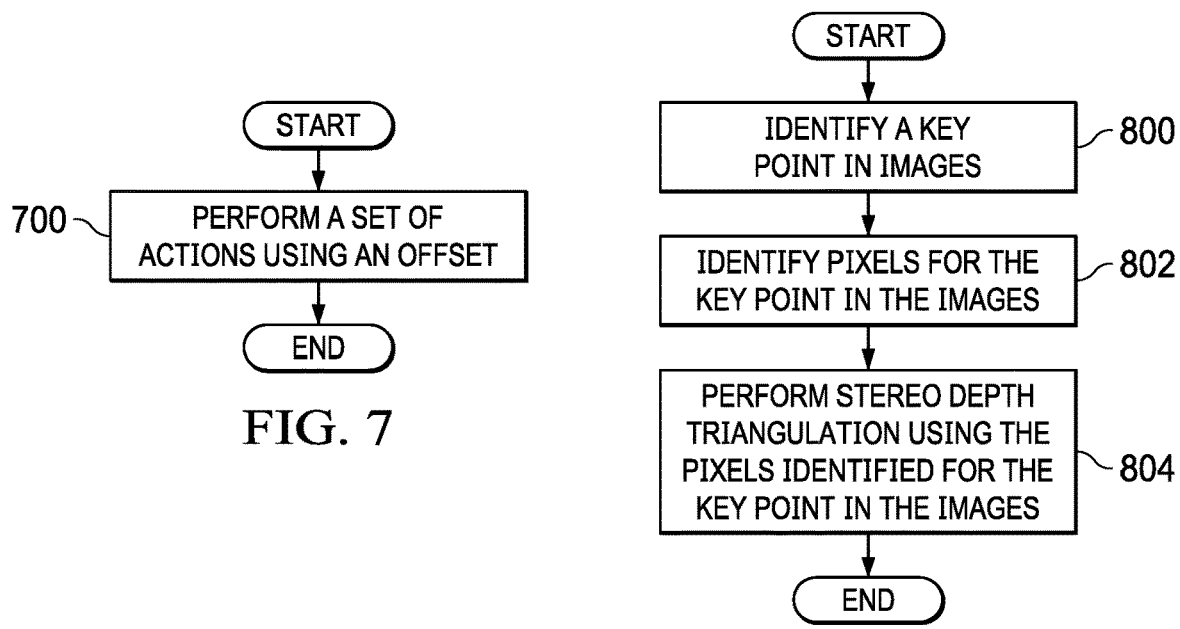
FIG. 7
FIG. 8

AIRCRAFT SENSOR SYSTEM SYNCHRONIZATION

RELATED PROVISIONAL APPLICATION

This application is related to and claims the benefit of priority of provisional U.S. Patent Application Ser. No. 63/126,450, entitled "AIRCRAFT SENSOR SYSTEM SYNCHRONIZATION", filed on Dec. 16, 2020, which is hereby incorporated by reference.

BACKGROUND INFORMATION

1. Field

The present disclosure relates generally to aircraft and, in particular, to a method, apparatus, and system for coordinating an operation of multiple aircraft with increased precision.

2. Background

Photogrammetry is the use of photography to make measurements. Photogrammetry uses images in surveying and mapping to measure distances between objects. For example, photogrammetry can be used to plot contour lines on topographic maps. Photogrammetry can also be used to create point cloud models for three-dimensional models of an environment. For example, a point cloud model can be generated from photographs of crops in a field, a park, a city block, a stadium, a terrain, or other objects of interest.

An aircraft with a camera system can fly over a region, such as a park, a field with crops, a city, or other region. The aircraft generates images of the region in which overlaps are present in the images of the region. Features in overlapping areas are used to accurately triangulate and identify key points in the images as part of a process to generate a model.

This process of using photogrammetry to make measurements of a region is time-consuming. The process involves downloading images from aircraft and processing data to generate point clouds of the region. This type of mapping of regions can be more time-consuming than desired.

Therefore, it would be desirable to have a method and apparatus that take into account at least some of the issues discussed above, as well as other possible issues. For example, it would be desirable to have a method and apparatus that overcome a technical problem with generating data to survey and map regions.

SUMMARY

An embodiment of the present disclosure provides an aerial imaging system comprising a computer system and a controller in the computer system. The controller is configured to determine a first altitude of a first aircraft using first images of a key point generated by the first aircraft and stereo depth triangulation. The controller is configured to compare the first altitude with a second altitude determined for a second aircraft by at least one of the stereo depth triangulation using second images of the key point generated by the second aircraft and by measurements made by a sensor system in the second aircraft to form a comparison. The controller is configured to determine an offset between the first altitude determined for the first aircraft and the second altitude measured by the second aircraft using the comparison.

Another embodiment of the present disclosure provides an aerial imaging system comprising a first camera system, an altitude sensor system, and a controller for an aircraft. The first camera system is carried by a first aircraft and generates first images during a flight of the first aircraft. The altitude sensor system is carried by the first aircraft and a first altitude for the first aircraft. The controller is configured to determine a first distance from the first aircraft to a key point using first images of a key point generated by the first camera system associated with the first aircraft during the flight of the first aircraft and stereo depth triangulation. The controller is configured to receive, from a second aircraft, a second distance to the key point from the second aircraft and a second altitude measured for the second aircraft. The controller is configured to compare the first distance to the key point from the first aircraft and first altitude with the second distance to the key point from the second aircraft and the second altitude to form a comparison. The controller is configured to determine an offset between the first altitude for the first aircraft and the second altitude for the second aircraft using the comparison, wherein the offset is used to adjust an altitude of the first aircraft.

Yet another embodiment of the present disclosure provides a method for operating an aerial imaging system. A first altitude of a first aircraft is determined, by a computer system, using first images of a key point generated by the first aircraft during a flight of the first aircraft and stereo depth triangulation. The first altitude is compared with a second altitude of a second aircraft determined by the second aircraft, by the computer system, to form a comparison. An offset between the first altitude and the second altitude is determined, by the computer system, using the comparison. At least one of the first altitude or the second altitude is adjusted, by the computer system, based on the offset. A plurality of images of a region from the first aircraft at the first altitude and from the second aircraft at the second altitude is obtained by the computer system.

Still another embodiment of the present disclosure provides a computer program product for operating an aerial imaging system. The computer program product comprises a computer-readable storage media with first program code, second program code, and third program code stored on the computer-readable storage media. The program code is executable by a computer system to cause the computer system to determine a first distance from a first aircraft to a key point using first images of a key point generated by the first aircraft during a flight of the first aircraft and stereo depth triangulation. The second program code is executable by the computer system to cause the computer system to compare the first distance to the key point from the first aircraft and a first altitude for the first aircraft measured by the first aircraft with a second distance to the key point from a second aircraft and a second altitude for the second aircraft measured by the second aircraft to form a comparison. The third program code is executable by the computer system to cause the computer system to determine an offset between the first altitude for the first aircraft and the second altitude measured by the second aircraft using the comparison, wherein the offset is used to adjust an altitude of the first aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a flowchart of a process for operating an aerial imaging system in accordance with an illustrative embodiment;

FIG. 7 is an illustration of a flowchart of a process for performing an action using offsets in accordance with an illustrative embodiment;

FIG. 8 is an illustration of a flowchart of a process for identifying a distance to a key point in accordance with an illustrative embodiment;

DETAILED DESCRIPTION

Figure 1:
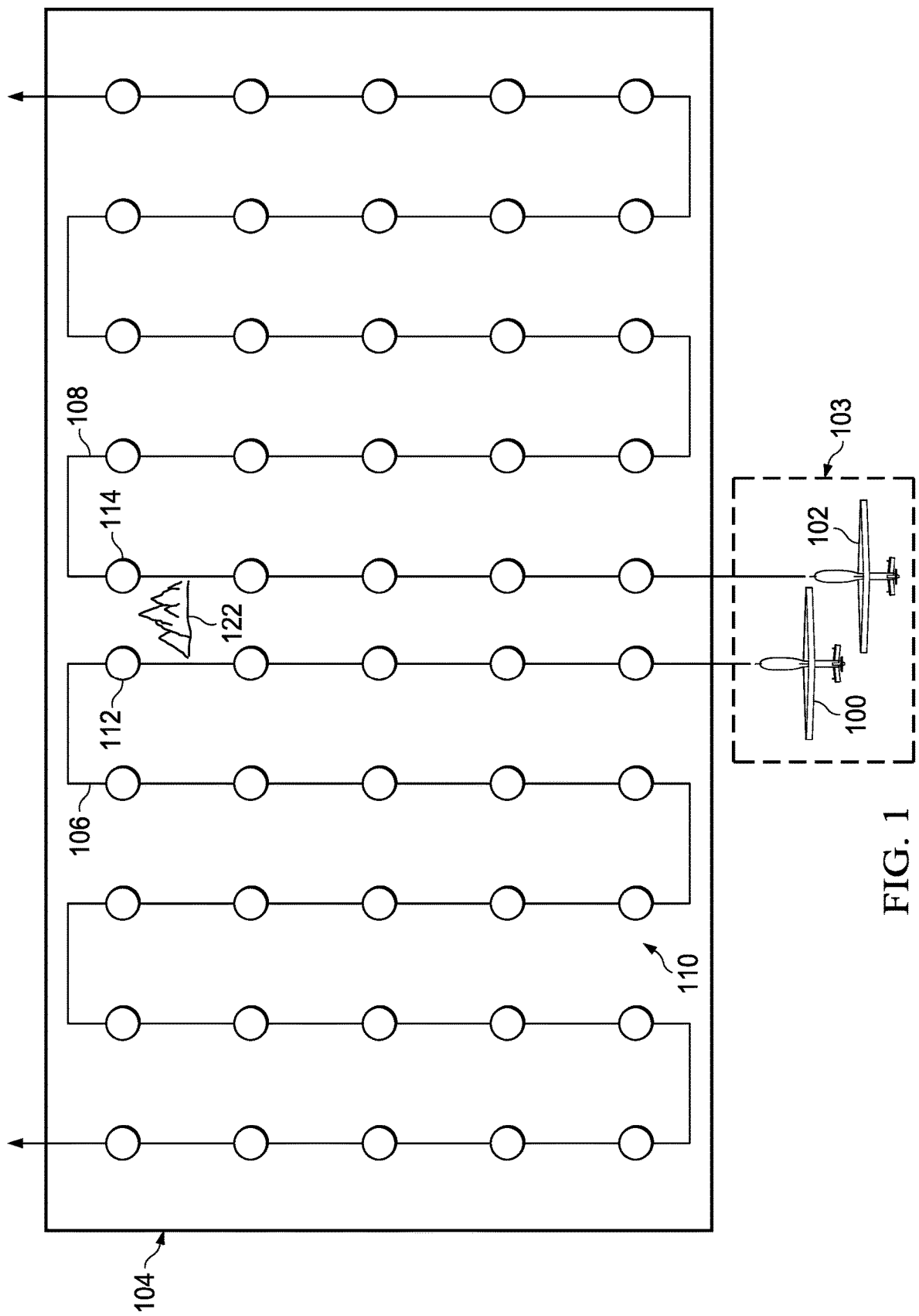
FIG. 1 is a pictorial illustration of image generation by an aerial imaging system in accordance with an illustrative embodiment.

The illustrative embodiments recognize and take into account one or more different considerations. For example, the illustrative embodiments recognize and take into account that an amount of flight time can be reduced by having an aircraft fly at a higher altitude such that a camera system generates images of larger areas in a region being mapped. The illustrative embodiments recognize and take into account, however, that although time needed to generate data for the region is reduced, resolution of the data is also reduced.

The illustrative embodiments recognize and take into account that a single aircraft can take hours to cover areas in a region being mapped. The post-processing of these images is performed when the images are downloaded after a flight. As a result, multiple data sets may be present from an aircraft performing multiple flights to generate images for a region. The illustrative embodiments also recognize and take into account that the images in a data set from one flight can take several hours to process. Further, the illustrative embodiments also recognize and take into account that once the data sets are processed, the data sets are stitched together and reprocessed. Thus, the illustrative embodiments recognize and take into account that it can take days to process and refine the data sets to produce an acceptable point cloud of the region.

The illustrative embodiments recognize and take into account that another solution may involve using multiple aircraft with camera systems to fly over a region and generate images for the region. The illustrative embodiments recognize and take into account that using the multiple aircraft may reduce flight time. The illustrative embodiments recognize and take into account, however, that with the multiple aircraft generating the images of the region, errors can be present that increase a difficulty in generating an accurate point cloud from the images.

The illustrative embodiments recognize and take into account that sensor errors can reduce accuracy of a point cloud and increase time needed to create the point cloud from images. For example, the illustrative embodiments recognize and take into account that multiple aircraft may fly at different altitudes from each other. As a result, stitching of the images generated from the multiple aircraft may be more difficult to form accurately and take more time than desired.

The illustrative embodiments recognize and take into account that differences in altitudes can be taken into account. The illustrative embodiments recognize and take into account that knowing an altitude of an aircraft when generating images is important in accurately stitching the images together and forming a point cloud when the images of a region generated by the aircraft are generated at different altitudes. The illustrative embodiments recognize and take into account that sensors for determining the altitude of a current aircraft, such as UASs, are less accurate than desired for purposes of processing the images from an unmanned aerial system to generate a point cloud.

For example, the illustrative embodiments recognize and take into account that a barometric altitude sensor may not be as accurate as desired. For example, changes in temperature, air pressure, or both can occur over different areas of a region. As a result, different UASs applying a pattern of the region may obtain different altitude readings even if the UASs are flying at a same altitude. The illustrative embodiments recognize and take into account that this issue is compounded when the aircraft fly at different altitudes.

As another example, the illustrative embodiments recognize and take into account that a global positioning system (GPS) unit in an aircraft also may be less accurate than desired. As UASs fly over different areas of a region to generate images, cloud cover and other environmental factors can change signal strength in a manner that affects accuracy in an altitude determined by the global positioning system unit or the UASs.

Thus, the illustrative embodiments provide a method, apparatus, and system for reducing error in determining altitude between multiple aircraft. In the illustrative examples, camera systems can be used to synchronize multiple aircraft. For example, a camera system can be used to generate images of key features as multiple aircraft fly over the key features and generate images that contain the key features.

In one illustrative example, a first distance from a first aircraft to a key point is determined using first images of the key point generated by the first aircraft during flight of the first aircraft and a first altitude for the first aircraft measured by the first aircraft. The first distance to the key point from the first aircraft and first altitude for the first aircraft for the key point are compared with a second distance to the key point from a second aircraft and a second altitude for the second aircraft to form a comparison. An offset between the first altitude for the first aircraft and a second altitude measured by the second aircraft is determined using the comparison. The offset is used to adjust an altitude of the first aircraft.

In the illustrative example, this offset is used in a number of different ways. For example, the offset can be used to adjust the altitude of one of the two aircraft. In another illustrative example, offsets can be used to adjust altitudes in metadata for the images taken by at least one of the first aircraft or the second aircraft. These and other actions can be performed using the offset. Further, this offset can be determined numerous times depending on the particular mission.

With reference now to the figures and, in particular, with reference to FIG. 1, a pictorial illustration of image generation by an aerial imaging system is depicted in accordance with an illustrative embodiment. In this illustrative example, the aerial imaging system comprises unmanned aerial vehicle 100 and unmanned aerial vehicle 102.

As depicted, unmanned aerial vehicle 100 and unmanned aerial vehicle 102 are part of aerial imaging system 103 and can operate to generate images of object of interest 104. In this illustrative example, object of interest 104 is a region or an area of land. In another illustrative example, object of interest 104 can be a building, a dam, or some other suitable object of interest.

In this illustrative example, unmanned aerial vehicle 100 travels along flight path 106, and unmanned aerial vehicle 102 travels along flight path 108 to generate images of object of interest 104 or at least a portion of object of interest 104. As depicted, flight path 106 results in unmanned aerial vehicle 100 flying over a portion of region of interest 104. Flight path 108 results in unmanned aerial vehicle 102 flying over another portion of object of interest 104.

As depicted, unmanned aerial vehicle 100 and unmanned aerial vehicle 102 generate images at each of waypoints 110, such as waypoint 112 and waypoint 114, along flight path 106 and flight path 108.

As depicted, the images generated by unmanned aerial vehicle 100 at waypoint 112 and the images generated by unmanned aerial vehicle 102 at waypoint 114 overlap in which the overlap in these images includes key point 122. In this illustrative example, key point 122 is a key point that can be used to take into account a difference in altitudes for unmanned aerial vehicle 100 and unmanned aerial vehicle 102.

For example, it may be desirable for unmanned aerial vehicle 100 and unmanned aerial vehicle 102 to generate the images at waypoints 110 at a same altitude as these unmanned aerial vehicles fly over object of interest 104. However, the altitude measured by unmanned aerial vehicle 100 and unmanned aerial vehicle 102 may have errors such that even though these unmanned aerial vehicles may be commanded to fly at the same altitude, they may actually be flying at different altitudes. These errors can be caused by inaccuracies in sensors used to measure altitude, such as calibration errors. Such errors can cause inaccuracies in data sets used to generate a point cloud of an object or area of land. If the images in the data sets have incorrect altitudes, combining those data sets to form the point cloud results in the point cloud having inaccuracies.

In this illustrative example, the different altitudes can be identified such that the errors in actual altitudes can be taken into account. For example, the difference, also referred to as an offset, can be used to adjust the altitude of unmanned aerial vehicle 100 such that unmanned aerial vehicle 100 and unmanned aerial vehicle 102 fly at the same altitude. In another example, the adjustment can be made in both unmanned aerial vehicle 100 and unmanned aerial vehicle 102 based on the offset in the difference in altitudes between unmanned aerial vehicle 100 and unmanned aerial vehicle 102.

Thus, the offset can be used to calibrate altitude sensors for at least one of unmanned aerial vehicle 100 and unmanned aerial vehicle 102. In this depicted example, altitudes measured by one or both of these unmanned aerial vehicles may be in error, causing the two aerial vehicles to fly at different altitudes when the same altitude is desired. Thus, the images generated by these unmanned aerial vehicles can be used to identify the actual altitudes.

For example, unmanned aerial vehicle 100 can generate two or more images of key point 122. Unmanned aerial vehicle 100 can identify a presence of key point 122 in the images generated at waypoint 112 and waypoint 114. In this example, a first image can be generated at waypoint 112 and a second image can be generated at waypoint 114. Unmanned aerial vehicle 100 can determine a first distance to key point 122 from waypoint 112 using these images.

In this example, key point 122 can be an object or a feature in an object. Key point 122 can be any object or feature in an object having a size that can be used as a reference point. In one example, key point 122 can be an object or feature that is represented by a pixel or a center of a group of pixels capturing the same key point. In this example, the first distance can be determined using stereo depth triangulation or some other suitable technique.

Further, unmanned aerial vehicle 100 can measure a first altitude for unmanned aerial vehicle 100 using a barometric altitude sensor associated with unmanned aerial vehicle 100. This measurement can be made at waypoint 112.

In this depicted example, unmanned aerial vehicle 102 also identifies key point 122 in the images generated by unmanned aerial vehicle 102 at waypoint 114. Unmanned aerial vehicle 102 determines a second distance from waypoint 114 to key point 122 using the images generated by unmanned aerial vehicle 102 and stereo depth triangulation. In this illustrative example, unmanned aerial vehicle 102 can measure a second altitude for unmanned aerial vehicle 102 at waypoint 114. The second altitude can be measured using a barometric altitude sensor associated with unmanned aerial vehicle 100.

As depicted, unmanned aerial vehicle 102 transmits the second distance to unmanned aerial vehicle 100. Additionally, unmanned aerial vehicle 102 transmits the second altitude for unmanned aerial vehicle 102 measured by unmanned aerial vehicle 102 to unmanned aerial vehicle 100.

Unmanned aerial vehicle 100 can then determine the offset using the distances to key point 122 from each of the unmanned aerial vehicles and the altitudes measured by each of the unmanned aerial vehicles. In another illustrative example, the altitudes can be calculated using the images for determining the offset between the altitudes measured using barometric altitude sensors in unmanned aerial vehicle 100 and unmanned aerial vehicle 102.

The offset can then be used by at least one of unmanned aerial vehicle 100 or unmanned aerial vehicle 102 to make adjustments in altitude. This adjustment can be made with respect to the altitude at which one or both of the unmanned aerial vehicles fly. The adjustment can be made to the altitude recorded in the metadata generated for the images or the adjustment can be used to calibrate the altitude sensors.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The illustration of this example in FIG. 1 is not meant to limit the manner in which other illustrative examples can be implemented. In another illustrative example, flight path 106 and flight path 108 can generate images at the same waypoints in which the images contain key point 122. Other key points can be used in addition to or in place of key point 122 to determine the offset. The offset can be determined more than once during a mission in which unmanned aerial vehicle 100 and unmanned aerial vehicle 102 generate images of object of interest 104. For example, flight path 106 and flight path 108 can be selected such that the images generated by these unmanned aerial vehicles include other key points located in object of interest 104. In other illustrative examples, the unmanned aerial vehicles could fly outside of object of interest 104 to generate images that include a key point for use in determining an offset. As another example, the processing of the images in the determination of the offset can be performed in other locations other than in one or both of the unmanned aerial vehicles. For example, the processing can be performed using a remote data processing system, a cloud service, or some other component remote to the unmanned aerial vehicles.

Figure 2:
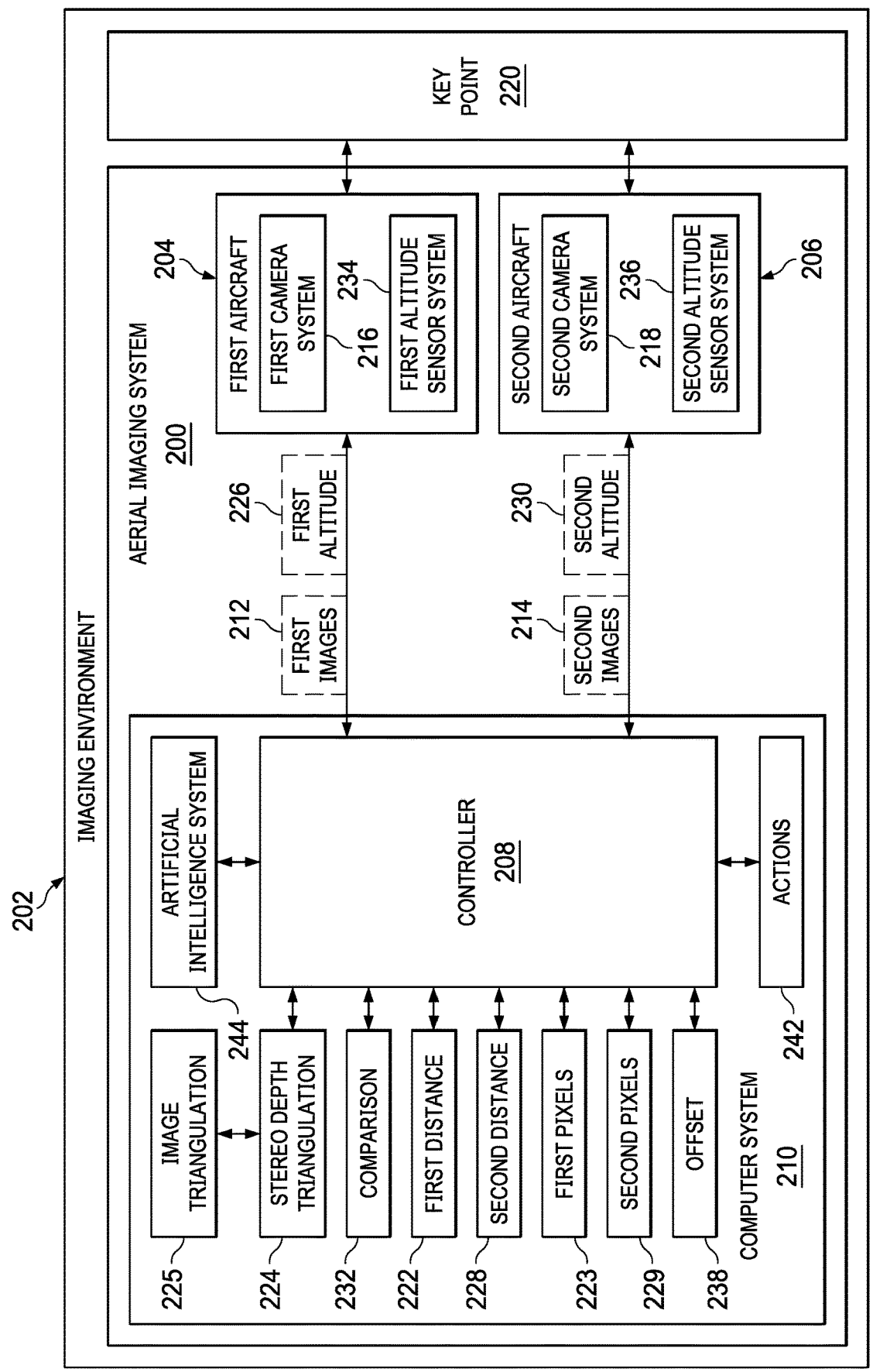
FIG. 2 is an illustration of an imaging environment in accordance with an illustrative embodiment.

With reference now to FIG. 2, an illustration of an imaging environment is depicted in accordance with an illustrative embodiment. In this illustrative example, aerial imaging system 103 is an example of one implementation for aerial imaging system 200 in imaging environment 202.

As depicted, aerial imaging system 200 comprises first aircraft 204 and can include second aircraft 206. First aircraft 204 and second aircraft 206 are selected from at least one of an airplane, an unmanned aerial system, an unmanned aerial vehicle, a drone, a rotorcraft, a spacecraft, or some other suitable type of aircraft. As depicted, first aircraft 204 and second aircraft 206 can be the same or different types of aircraft.

As depicted, controller 208 in computer system 210 is configured to control an operation of at least one of first aircraft 204 or second aircraft 206.

Controller 208 can be implemented in software, hardware, firmware, or a combination thereof. When software is used, the operations performed by controller 208 can be implemented in program code configured to run on hardware, such as a processor unit. When firmware is used, the operations performed by controller 208 can be implemented in program code and data and stored in persistent memory to run on a processor unit. When hardware is employed, the hardware can include circuits that operate to perform the operations in controller 208.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

As depicted, first aircraft 204 generates first images 212 and second aircraft 206 generates second images 214. First images 212 can be generated by first camera system 216 carried by first aircraft 204. Second images 214 can be generated by second camera system 218 carried by second aircraft 206. Each of these camera systems are physical hardware systems and can include software. These camera systems can include one or more cameras or sensors capable of generating images. The cameras can be selected from at least one of a visible light camera, an infrared camera, an ultraviolet sensor, a visible light sensor, a near-infrared sensor, a short wave infrared sensor, a mid-wave infrared sensor, a long wave infrared (LWIR) sensor, a bolometer, an electro-optical camera, an infrared sensor, a thermal sensor, or some other suitable type of sensor.

Controller 208 can identify key point 220 in first images 212 generated by first camera system 216 carried by first aircraft 204. Key point 220 can be one of an area of land, a mountain, a tower, a building, a lake, a dam, a tower, a marker, a pattern, a very high frequency (VHF) omnidirectional range (VOR) antennae, or some other suitable physical object.

The identification of key point 220 can be made in a number of different ways. For example, controller 208 can use at least one of artificial intelligence system 244 or various image processing techniques to identify key point 220 in first images 212 and second images 214.

Artificial intelligence system 244 is a system that has intelligent behavior and can be based on the function of a human brain. Artificial intelligence system 244 can comprise at least one of an artificial neural network, a cognitive system, a Bayesian network, a fuzzy logic, an expert system, a natural language system, or some other suitable system. Machine learning is used to train artificial intelligence system 244. Machine learning involves inputting data into the process and allowing the process to adjust and improve the function of artificial intelligence system 244.

A machine learning model in artificial intelligence system 244 is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, an anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

As depicted, controller 208 can determine first distance 222 from first aircraft 204 to key point 220 using first images 212 of key point 220 generated by first aircraft 204 during flight of first aircraft 204 and stereo depth triangulation 224. In this example, stereo depth triangulation 224 performed using images of key point 220 is also referred to image triangulation 225.

In this illustrative example, stereo depth triangulation 224 is a triangulation process using stereo analysis. This type of triangulation process can determine a distance to an object in an image based on multiple images of the object, such as key point 220 taken from different views or locations.

In this example, first distance 222 is the distance from first aircraft 204 to key point 220. More specifically, first distance 222 is from the imaging device in first aircraft 204 to key point 220. For example, first distance 222 can be determined using stereo depth triangulation 224 that is performed using first pixels 223 for key point 220 in first images 212. Second distance 228 can be determined using stereo depth triangulation 224 that is performed using second pixels 229 for key point 220 in second images 214. This determination can be made using controller 208. In the determination of first distance 222, this distance can be determined with respect to first aircraft 204 at the location between where a first image and a second image of first images 212 was taken. First distance 222 is determined using the first image and the second image.

In the illustrative example, first pixels 223 and second pixels 229 can be for one or more dimensions or features of key point 220. For example, when key point 220 is a mountain, pixels identified in the images can be for at least one of pixels in the base of the mountain, pixels up to the height of the mountain, or other attributes in the mountain. As another example, when key point 220 is a crossroad, the pixels can be for the width of the crossroad. When key point 220 is a satellite dish, the pixels can be a line of pixels across a diameter of the satellite dish.

As depicted, controller 208 can compare first distance 222 to key point 220 from first aircraft 204 and first altitude 226 for first aircraft 204 measured by first aircraft 204 with second distance 228 to key point 220 from second aircraft 206 and second altitude 230 for second aircraft 206 measured by second aircraft 206 to form comparison 232. Ratios of these values can be used to determine offset 238 between first altitude 226 and second altitude 230. First distance 222 and second distance 228 are considered to be correct.

In this illustrative example, first altitude 226 is measured by first aircraft 204 using first altitude sensor system 234 in first aircraft 204. In this illustrative example, second altitude 230 can be measured by second altitude sensor system 236 in second aircraft 206. An altitude sensor system can comprise at least one of a barometric sensor, a global positioning system (GPS) receiver, or some other suitable type of sensor.

In this illustrative example, controller 208 can determine offset 238 between first altitude 226 for first aircraft 204 measured by first aircraft 204 and second altitude 230 measured by second aircraft 206 using comparison 232. In this illustrative example, offset 238 is used to adjust the altitude of at least one of first aircraft 204 or second aircraft 206.

As depicted, controller 208 can perform a set of actions 242 using offset 238. The set of actions 242 can be selected from at least one of: adjusting altitude information for points in point clouds derived from images generated of an environment by first aircraft 204 and second aircraft 206; executing a mission for first aircraft 204 and second aircraft 206; controlling first aircraft 204 and second aircraft 206; synchronizing sensor systems that measure altitude in first aircraft 204 and second aircraft 206; coordinating routes of first aircraft 204 and second aircraft 206; synchronizing altitudes flown by first aircraft 204 and second aircraft 206; coordinating a flight of first aircraft 204 and second aircraft 206 in a formation; or other suitable actions. In adjusting the altitude information for the points, altitudes recorded for the points can be adjusted such that the coordinates of the points in the point clouds generated from different data sets generated by different aircraft align correctly.

As used herein, a "set of," used with reference to items, means one or more items. For example, a "set of actions 242" is one or more of actions 242.

In one illustrative example, one or more technical solutions are present that overcome a technical problem with generating data to survey and map regions. As a result, one or more technical solutions can provide a technical effect of enabling corresponding altitudes between two or more aircraft generating data such as images. In this manner, processing of these data sets can be performed more quickly when altitudes between the two or more aircraft generating the data sets can be adjusted to have the same altitude. An offset can be used to adjust the altitude actually flown by the aircraft. Further, the illustrative example can also be used to adjust the altitude stored in metadata for the images generated by the aircraft.

By determining corrections in altitude measurements between two or more aircraft using an illustrative example, other types of missions can be performed with greater efficiency and accuracy. For example, precision flying, such as using drones for aerial shows, can be performed with smaller tolerances and distances between the drones flying in a formation or flying maneuvers with respect to each other using an illustrative example to determine an offset between measurements made between two or more drones. These and other missions can be performed more accurately using the illustrative example.

In one illustrative example, the identification of offset 238 can be used in the process in which plurality of aircraft 207 performs a mission in which data sets in the form of images are generated from multiple aircraft in plurality of aircraft 207. For example, first aircraft 204 and second aircraft 206 can generate the images. One or more aircraft in plurality of aircraft 207 in addition to these two aircraft can also operate to generate the images.

The data sets containing the images generated by plurality of aircraft 207 can then be processed. Further, an altitude for at least one of plurality aircraft 207 can be corrected such that accuracy in processing the images can be increased. For example, the images can be processed to generate point clouds. With the corrected altitude for one or more of plurality of aircraft 207, the accuracy in the point cloud of an object can be improved as compared to current techniques. Each set of images from each of plurality of aircraft 207 can be processed to generate a plurality point cloud for an object. This object can be, for example, a field, an area of land, a tree, a building, or some other suitable object. These point clouds can be combined to form a single point cloud for the object. With the correction of altitudes for the point clouds, single point clouds generated for the object can have a desirable accuracy.

Computer system 210 can be configured to perform at least one of the steps, operations, or actions described in the different illustrative examples using software, hardware, firmware, or a combination thereof. As a result, computer system 210 operates as a special purpose computer system in which controller 208 in computer system 210 enables operating aerial imaging systems with a desired level of performance. In particular, controller 208 transforms computer system 210 into a special purpose computer system as compared to currently available general computer systems that do not have controller 208.

The illustration of aerial imaging environment in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 208 and computer system 210 are shown as being external to first aircraft 204 and second aircraft 206. In an illustrative example, computer system 210 and controller 208 can be located in first aircraft 204. In another illustrative example, computer system 210 and controller 208 can be distributed in first aircraft 204 and in second aircraft 206. In other words, controller 208 in the different data processing systems and computer system 210 can be distributed in the aircraft in aerial imaging system 200.

In yet another illustrative example, controller 208 and computer system 210 can be in a remote location to first aircraft 204 and second aircraft 206 or distributed in a location selected from at least one of a remote location, first aircraft 204, or second aircraft 206. This remote location can be, for example, a ground station or another aircraft.

Additionally, one or more aircraft in addition to or in place of first aircraft 204 and second aircraft 206 can be part of aerial imaging system 200. These aircraft can be of the same type or different types in different examples.

Figure 3:
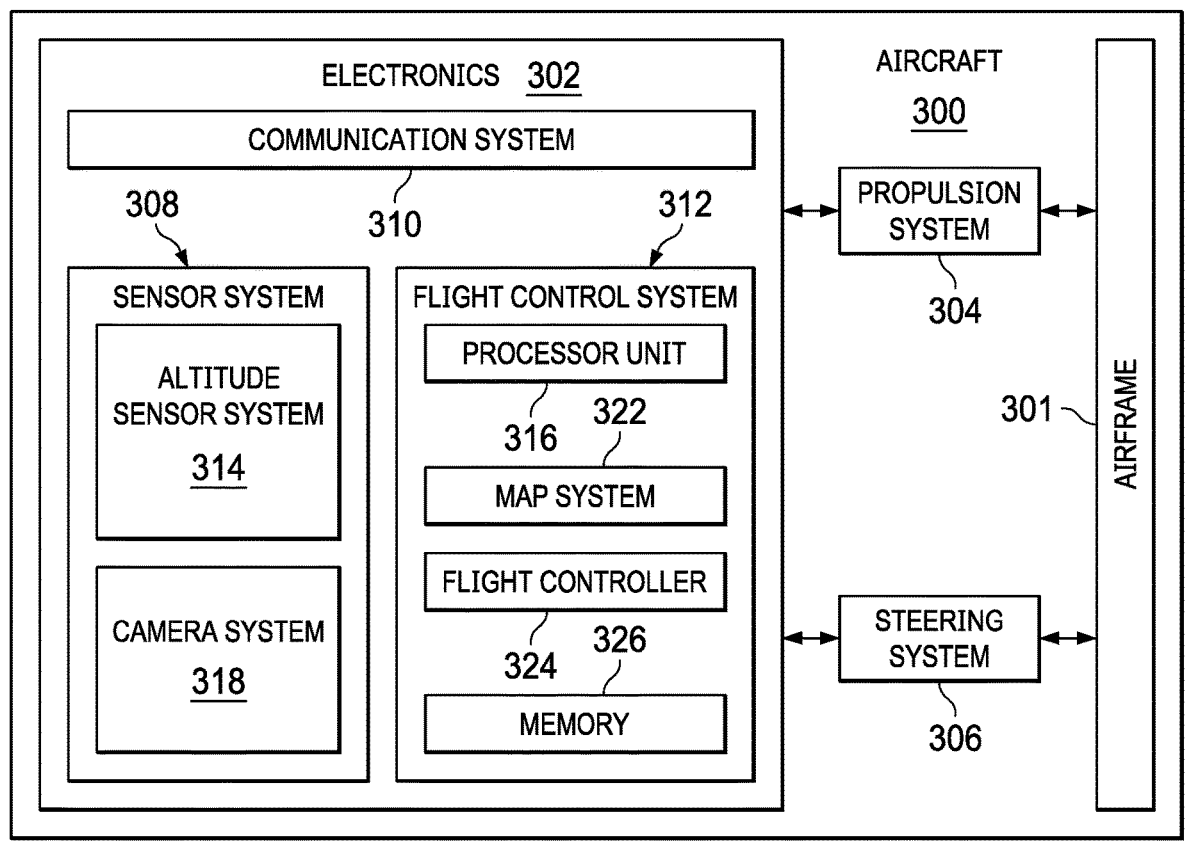
FIG. 3 is an illustration of a block diagram of an aircraft in accordance with an illustrative embodiment.

FIG. 3 is an illustration of a block diagram of an aircraft depicted in accordance with an illustrative embodiment. In this figure, aircraft 300 illustrates examples of components that can be used to implement first aircraft 204 and second aircraft 206 in FIG. 2.

In this illustrative example, aircraft 300 includes airframe 301, electronics 302, propulsion system 304, and steering system 306. Airframe 301 is a mechanical structure for aircraft 300. Airframe 301 can include, for example, a fuselage, an undercarriage, wings, landing gear, and other physical structures. In this illustrative example, airframe 301 carries electronics 302, propulsion system 304, and steering system 306.

Electronics 302 have a number of different components. As depicted, electronics 302 include sensor system 308, communication system 310, and flight control system 312.

In this illustrative example, sensor system 308 includes a number of different components. As depicted, sensor system 308 includes altitude sensor system 314, camera system 318, and other suitable sensors.

Altitude sensor system 314 is a physical sensor system and can include software. Altitude sensor system 314 is an example of an altitude sensor system that can be used to implement first altitude sensor system 234 and second altitude sensor system 236 in FIG. 2. Altitude sensor system 314 operates to measure an altitude of aircraft 300. For example, altitude sensor system 314 can include a barometric altimeter, a global positioning system (GPS) receiver, or other suitable types of sensors that can measure the altitude of aircraft 300.

As depicted, camera system 318 is a physical system that can include software. Camera system 318 is an example of a camera system that can be used to implement first camera system 216 and second camera system 218 in FIG. 2. Camera system 318 can include at least one of a visible light camera, an infrared camera, or some other suitable type of camera.

Examples of other types of sensors that can be included in sensor system 308 are at least one of a gyroscope, an accelerometer, an angle of attack (AoA) vane, or other suitable types of sensors. These and other sensors in sensor system 308 are in communication with flight control system 312. Information generated by sensor systems 308 can be used by flight control system 312 to control operation of aircraft 300 and navigate aircraft 300 along a flight path.

As depicted, propulsion system 304 is a physical system that generates a force to move aircraft 300. In the illustrative example, the force takes the form of thrust. Propulsion system 304 can include at least one of a jet engine, a turbofan, a turboprop, a ramjet, a rotor system, an electric propulsion, a hybrid propulsion, or some other suitable engine or propulsion device that can generate the thrust for aircraft 300.

In this illustrative example, steering system 306 can be configured to steer aircraft 300 on a flight path to reach an objective. Steering system 306 can be operated autonomously or under manned control. In this illustrative example, steering system 306 responds to signals from flight controller 324 in flight control system 312, which may employ feedback or other control systems to direct aircraft 300 along a flight path.

As depicted, communication system 310 is a physical device and may be, for instance, a wireless transceiver and antenna. Communication system 310 can exchange information with a remote computer system. Communication system 310 can operate to send and receive information to a remote location such as another aircraft or a ground station.

As depicted, flight control system 312 can determine one or more flight paths for aircraft 300 to reach a desired location based upon signals received from components of a navigation system. Flight control system 312 can calculate, generate, and send navigation commands, such as data signals, to steering system 306 to direct aircraft 300 along a flight path.

In this illustrative example, flight control system 312 includes a number of components. As depicted, flight control system 312 includes map system 322, flight controller 324, processor unit 316, and memory 326.

As depicted, map system 322 can be part of a map-based flight control system that provides positional information about natural and manmade features within a region. Map system 322 can communicate with other components in flight control system 312 to support navigation of aircraft 300. While this function can include providing map information for calculation of routes, this function can also include independent navigational capabilities.

For example, map system 322 can provide a map-based navigation system that stores a map of an operating environment including one or more objects. The map-based navigation system may be coupled to cameras and configured to determine a position of a vehicle by comparing stored objects to a visible environment, which may provide position data in the absence of global positioning system (GPS) data or other positional information.

In this illustrative example, processor unit 316 is a physical device and can be in communication with at least one of map system 322, flight control system 312, sensor system 308, propulsion system 304, or steering system 306, and the other various other components, systems, and subsystems that may be present in aircraft 300. Processor unit 316 can be an internal processor in a computer system such as computer system 210 in FIG. 2 to support various functions such as navigational functions or image processing functions. Processor unit 316 can be configured to control operation of at least one of map system 322, flight control system 312, sensor system 308, propulsion system 304, or steering system 306 for aircraft 300.

As depicted, processor unit 316 can perform processing and calculation functions to support at least one of navigating, identifying a key point, determining a distance to the key point, determining an offset to an altitude measured by altitude sensor system 314, or other suitable functions. Processor unit 316 may include a number of different processors cooperating to perform the operations for controller 208 in FIG. 2 described herein. For example, an internal processor in aircraft 300 controls operation of aircraft 300 while another processor assigned to controller 208 controls identifying a key point in images, determining the distance to the key point using the images, comparing a first distance and a first altitude of aircraft 300 to a second distance and a second altitude for a second aircraft to form a comparison, determining offsets between the first altitude and the second altitude, and performing one or more actions using the offsets.

Flight controller 324 can operate to control components in aircraft 300 such as flight control system 312, sensor system 308, propulsion system 304, or steering system 306. Flight controller 324 is in communication with processor unit 316, aircraft 300, flight control system 312, sensor system 308, steering system 306, and the other various components of the devices and systems described herein.

As depicted, flight controller 324 can include any hardware, software, or some combination thereof for controlling the various components in aircraft 300 and flight control system 312 described herein, including, without limitation, microprocessors, microcontrollers, application-specific integrated circuits, programmable gate arrays, and any other digital and/or analog components, as well as combinations thereof, along with inputs and outputs for communicating control signals, drive signals, power signals, sensor signals, and other suitable types of signals.

In this illustrative example, memory 326 is a physical device and can include a local memory or a remote storage device that stores a log of data for flight control system 312, including, without limitation, images, distances determined, identification of key points, locations of key points, altitudes, and aircraft state information generated by sensor system 308. Other information that can be stored in memory 326 includes at least one of orientations, speeds, flight paths, steering specifications, global positioning system coordinates, sensor readings, and other suitable information. The information stored in memory 326 can be accessed by at least one of processor unit 316 or flight controller 324 in this example.

Although a particular arrangement of components is illustrated in FIG. 3, the arrangement of components may vary in other illustrative examples. For example, sensors in sensor system 308 can be located in or on aircraft 300. Further, at least one of sensor system 308, flight control system 312, or communication system 310 can share components, such as memory, sensors, processors, or controllers. Additionally, one or more sensors in sensor system 308 can be removably coupled to aircraft 300 or components in this module can be integrated into airframe 301 for aircraft 300 in any desired manner.

Flight control system 312 may also include the components described above as being part of electronics 302, as well as other sensors in sensor system 308. As another example, other sensors can also include other flight instrumentation, processing circuitry, communications circuitry, an optical system including cameras and other sensors that are necessary or useful for operation of an unmanned aerial system, or other autonomously or manually piloted aircraft. Thus, the arrangement of the various components may be configured as desired by the designer or operator and therefore should not be limited to a particular example described or illustrated herein.

Figure 4:
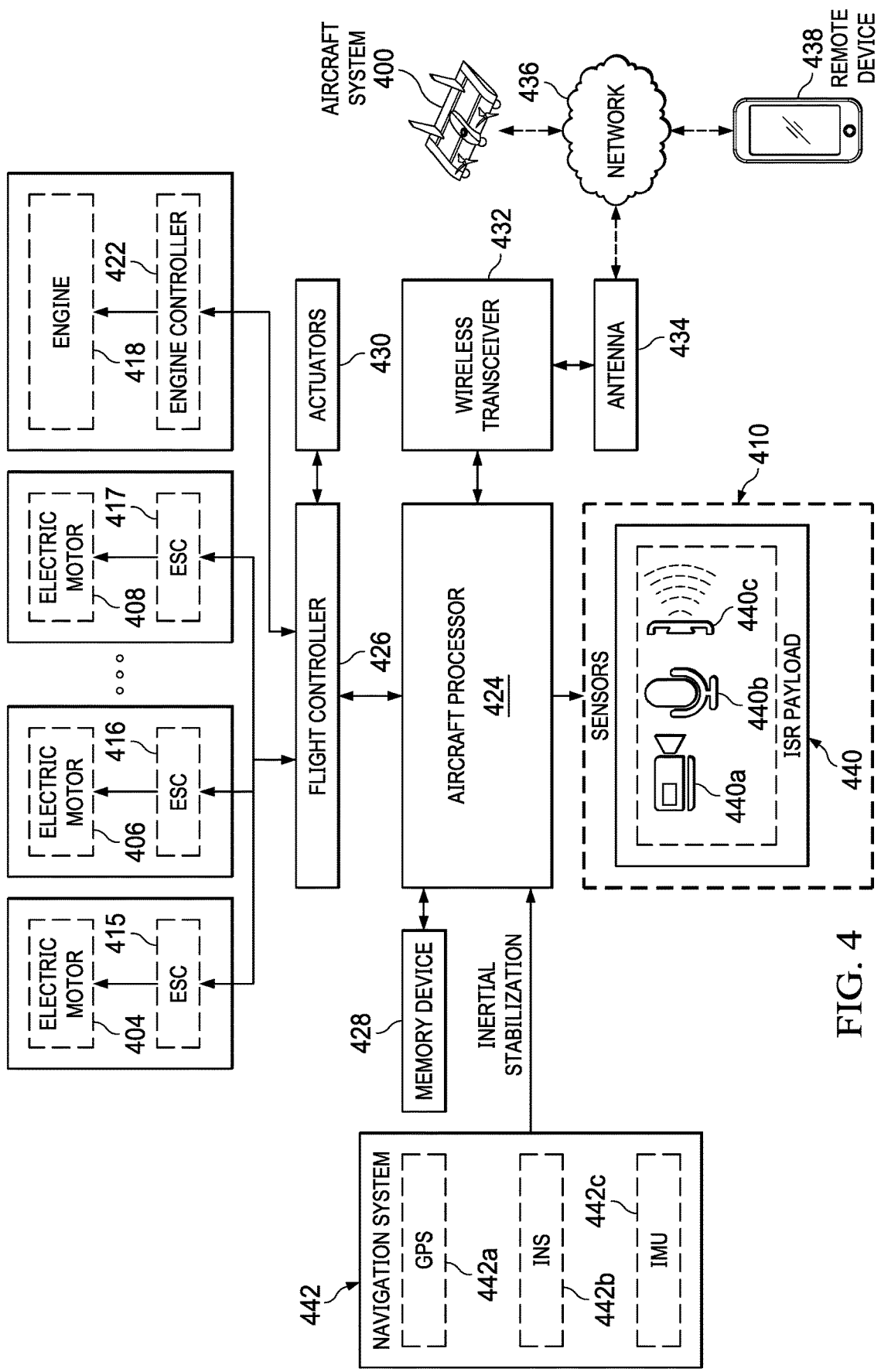
FIG. 4 is an illustration of a block diagram of an aircraft system in accordance with an illustrative embodiment.

FIG. 4 is an illustration of a block diagram of an aircraft system in accordance with an illustrative embodiment. In this figure, aircraft system 400 illustrates examples of components that can be implemented in at least one of first aircraft 204 or second aircraft 206 in FIG. 2.

As illustrated, aircraft system 400 includes aircraft processor 424 communicatively coupled with at least one of memory device 428, flight controller 426, wireless transceiver 432, and navigation system 442. Aircraft processor 424 may be configured to perform one or more operations based at least in part on instructions (e.g., software) and one or more databases stored to memory device 428 (e.g., a hard drive, a flash memory, or the like). Aircraft system 400 may further include other desired components, such as wireless transceiver 432 coupled with antenna 434 to communicate data between aircraft system 400 and remote device 438. In the illustrative example, remote device 438 can be a human-machine interface, or another portable electronic device, such as a smartphone, a tablet, and a laptop computer, or a controller in a location such as at a base station. Aircraft system 400 may also communicate with another aircraft via wireless transceiver 432, thereby facilitating collaborative operations, for example.

In certain aspects, aircraft system 400 may communicate data (processed data, unprocessed data, etc.) with remote device 438 and/or another one of aircraft over network 436. In certain aspects, wireless transceiver 432 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. Remote device 438 may facilitate monitoring and/or control of aircraft system 400 and its payload(s), including ISR payload 440.

Aircraft processor 424 may be operatively coupled to flight controller 426 to control operation of various ones of actuators 430 (e.g., those to control movement and locking of any flight surfaces, such as at least one of the moveable flight control surfaces, electric motor 404 via electronic speed controller (ESC) 415, electric motor 406 via electronic speed controller (ESC) 416, electric motor 408 via electronic speed controller (ESC) 417, or engine 418 via engine controller 422 in response to commands from an operator, an autopilot, navigation system 442, or other high-level system via wireless transceiver 432. In certain aspects, aircraft processor 424 and flight controller 426 may be integrated into a single component or circuit. In operation, flight controller 426 may dynamically (i.e., in real-time or near real-time) and independently adjust thrust during the various stages of flight via ESC 416 or engine controller 422 (as the case may be) to control roll, pitch, or yaw of first aircraft 204 or second aircraft 206 in FIG. 2. When rotors with rotor blades (e.g., propellers) are used, flight controller 426 may vary the revolutions per minute (RPM) of the rotor and/or, where desired, vary the pitch of the rotor blades. For example, electric motors 408 may be controlled by adjusting power supplied to each electric motor from a power supply (e.g., a battery pack or a battery bank) via ESC 416.

Aircraft processor 424 may be operatively coupled to navigation system 442, which may include GPS 442a that is communicatively coupled with INS 442b and/or IMU 442c, which can include one or more gyros and accelerometers. GPS 442a gives an absolute drift-free position value that can be used to reset the INS solution or can be blended with it by use of a mathematical algorithm, such as a Kalman Filter. Navigation system 442 may communicate, inter alia, inertial stabilization data to aircraft processor 424.

To collect data and/or monitor an area, flight control system 312 may be equipped with additional ones of sensors 410, such as ISR payload 440 comprising, for example, one or more of cameras 440a (e.g., an optical instrument for recording or capturing images and/or video, including light detection and ranging (LiDAR) devices), audio devices 440b (e.g., microphones, echolocation sensors, etc.), and other sensors 440c to facilitate ISR functionality and provide ISR data (e.g., photographs, video, audio, sensor measurements, etc.). ISR payload 440 is operatively coupled to aircraft processor 424 to facilitate communication of the ISR data (sensor data) between ISR payload 440 and aircraft processor 424. The ISR data may be used to navigate aircraft system 400 and/or otherwise control aircraft system 400. In certain aspects, ISR payload 440 may be rotatably and pivotally coupled to, for example, the underside surface of an airframe (or another structural component, such as rotor booms or wings) via a gimbal system to enable ISR payload 440 to be more easily oriented downward to monitor objects below and/or on the ground. The data may be dynamically or periodically communicated from aircraft system 400 to remote device 438 over network 436 via wireless transceiver 432, or stored to memory device 428 for later access or processing.

Figure 5:
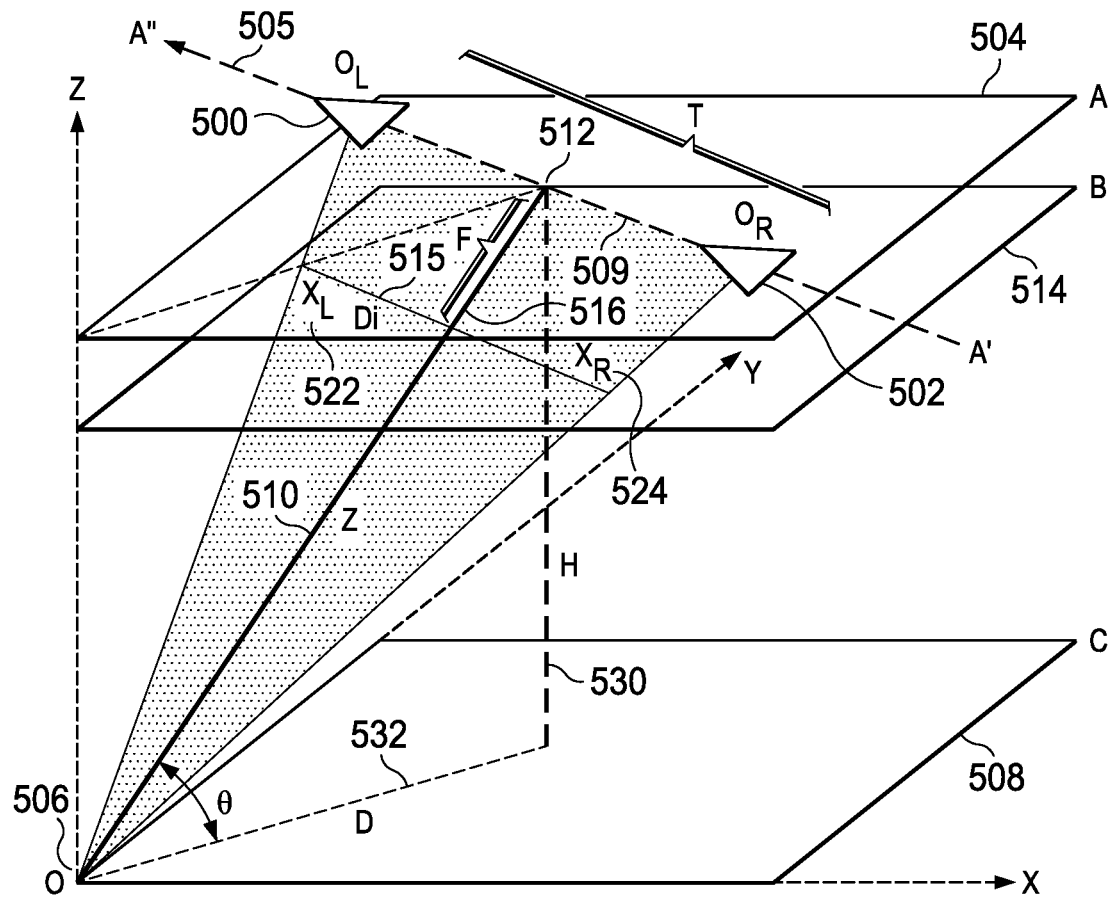
FIG. 5 is an illustration of triangulation using images in accordance with an illustrative embodiment.

With reference now to FIG. 5, an illustration of triangulation using images is depicted in accordance with an illustrative embodiment. In this illustrative example, the triangulation is similar to stereo triangulation in which images are taken in different locations by an imaging system. A stereo camera system is not needed in this example.

As depicted, first images are taken at first location 500 and second images are taken at second location 502 by an aircraft. In this depicted example, these images are similar to a right image and a left image taken by a stereo imaging system.

As depicted, these two images are taken by the aircraft on flight plane 504. Flight plane 504 is the plane for the aircraft traveling in the direction of line 505 on flight plane 504. The images include key point 506 on ground plane 508.

These images can be used to perform triangulation to determine distance Z 510 from point 512 to key point 506 on the ground. Distance Z 510 is a distance from a point to a line. This distance is the shortest distance from a given point to any points on a line. As a result, the measured distance is perpendicular to the line.

In this illustrative example, image plane 514 is the plane through focal point lengths for the images taken at first location 500 and second location 502. In this depicted example, focal length f 516 is a focal length of the imaging system in the aircraft at point 512. Image plane 514 is separated from flight plane 504 by focal length f 516 of the imaging system. In this example, point $X_L$ 522 and point $X_R$ 524 are points on image plane 514. The distance, Di 515, is the distance between point $X_L$ 522 and point $X_R$ 524 on image plane 514. As depicted, distance h 530 is the altitude in this example which is a distance from flight plane 504 to the ground. As shown, d 532 is a distance from key point 506 to distance h 530. As illustrated in FIG. 5, this distance is the shortest distance from a given point, key point 506, to any points on a line, distance h 530. In the illustrative example, d 532 can be determined from extrapolating a pixel to pixel distance base on the resolution of the camera system.

In this example, distance Z 510 from point 512 to key point 506 can be referred to as depth. Distance Z 510 can be calculated as follows:

$$Z = hf/Di$$

wherein Z is distance Z 510, h is distance h 530, f is focal length f 516, and Di is distance Di 515. With Z, you can solve for distance h 530 as follows:

$$Z^2 = d^2h^2.$$

As a result, the measured altitude can be compared with the calculated altitude, which is h 530. This comparison can be used to determine the offset. This offset can then be used to calibrate sensors in aircraft that measure altitude. This type of distance determination and calibration can be performed by each of the aircraft in a group of aircraft.

In another illustrative example, the measured altitude from a first aircraft may match the calculated altitude, and the measured altitude in the second aircraft may not match the calculated altitude. In this case, the measured altitude for the second aircraft can be corrected such that the altitudes at which operations are performed are the expected altitudes for both aircraft. In another example, both measured altitudes may be incorrect compared to the calculated altitudes. In this case, the offset can be identified for both of the aircraft and used to calibrate or correct the altitudes for the aircraft.

In another illustrative example, a first aircraft calculates a first distance, Z1, to a key point and measures a first altitude, ma1. The second aircraft can calculate a second distance, Z2, to the key points and measure a second altitude, ma2. One of the measured altitudes, such as ma1, can be assumed to be correct for purposes of calibration. The ratios of the measured altitudes to the distances to the key point can be used to determine the offset. For example, ma2=Z2ma1/z1, where ma2 is the offset.

Turning next to FIG. 6, an illustration of a flowchart of a process for operating an aerial imaging system is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in controller 208 in computer system 210 in FIG. 2. In this example, controller 208 in computer system 210 can be located in at least one of a first aircraft, a second aircraft, a remote location, or some other aircraft or vehicle.

The process begins by determining a first distance from a first aircraft to a key point using first images of the key point generated by the first aircraft during a flight of the first aircraft and stereo depth triangulation (operation 600). Operation 600 can determine the key points using object recognition processes that can be implemented using at least one of an artificial intelligence system, a machine learning model, a computer vision system, a genetic algorithm, an interpretation tree, or other suitable techniques or processes.

The process compares the first distance to the key point from the first aircraft and a first altitude for the first aircraft measured by the first aircraft with a second distance to the key point from a second aircraft and a second altitude for the second aircraft measured by the second aircraft to form a comparison (operation 602).

The process determines an offset between the first altitude for the first aircraft and the second altitude measured by the second aircraft using the comparison (operation 604). The process terminates thereafter. The offset can be used to adjust the altitude of the first aircraft. The adjustment can be made by adjusting the altitude at which the first aircraft flies. In another example, the altitude can be adjusted in metadata that is associated with the images generated by the first aircraft.

Turning next to FIG. 7, an illustration of a flowchart of a process for performing an action using offsets is depicted in accordance with an illustrative embodiment. This flowchart illustrates an additional operation that can be performed in the process in the flowchart depicted in FIG. 6.

The process begins by performing a set of actions using an offset (operation 700). This operation is performed after the offset is identified in operation 604 in FIG. 6. The process terminates thereafter.

In this illustrative example, the set of actions performed in operation 700 is selected from at least one of adjusting altitude information for points in point clouds derived from images generated of an environment by a first aircraft and a second aircraft; controlling a mission for the first aircraft and the second aircraft; coordinating routes of the first aircraft and the second aircraft; synchronizing altitudes flown by the first aircraft and the second aircraft; coordinating a flight of the first aircraft and the second aircraft in a formation; or other suitable actions.

With reference next to FIG. 8, an illustration of a flowchart of a process for identifying a distance to a key point is depicted in accordance with an illustrative embodiment. The process illustrated in this figure is an example of one manner in which operation 600 in FIG. 6 can be performed.

The process begins by identifying a key point in images (operation 800). In this example, at least two images are used for this determination. Each image in the images is generated at a different location.

The process identifies pixels for the key point in the images (operation 802). These pixels can be for one or more features of the key point. For example, the pixels can be a line of pixels along a base or side of the key point. In another example, the pixels can be a circumference of an area in the key point.

The process performs stereo depth triangulation using the pixels identified for the key point in the images (operation 804). The process terminates thereafter. Operation 804 results in a distance to the key point from the aircraft.

Figure 9:
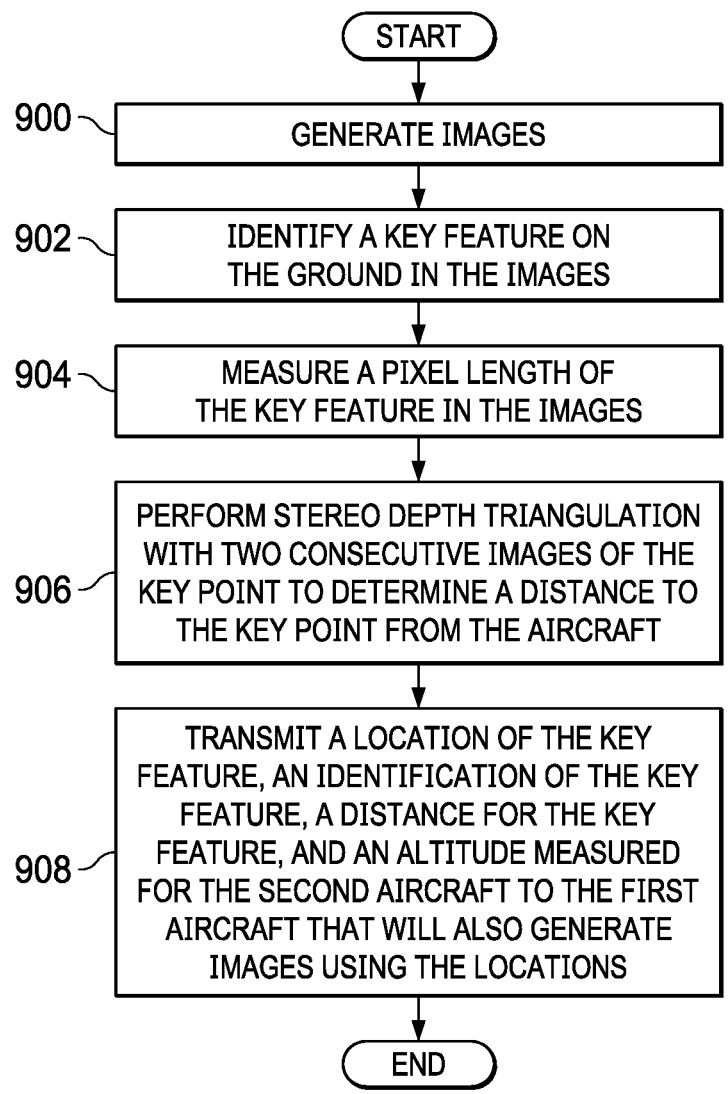
FIG. 9 is an illustration of a flowchart of a process performed by an aircraft to generate information used to operate an aerial imaging system in accordance with an illustrative embodiment.

Turning now to FIG. 9, an illustration of a flowchart of a process performed by an aircraft to generate information used to operate an aerial imaging system is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process can be implemented in second aircraft 206 in FIG. 2. For example, controller 208 and computer system 210 can be distributed such that some operations are performed in second aircraft 206.

The process in FIG. 9 can be performed using parameters that are determined or known for both aircraft. These parameters include focal length, field-of-view, image sensor dimensions, pixel count, latitude, longitude, velocity, altitude, vehicle orientation, and camera orientation. These parameters can used to perform triangulation as described with respect to FIG. 5 above. For example, focal length in stereo triangulation and a variable in the stereo triangulation are used to compute the distance to a point such as a landmark from a pair of images.

Field-of-view is used to determine if a given point such as a landmark will be visible in multiple images. If the field-of-view is known, then the area on the ground that will be captured can be predicted. This parameter can be used set a route for two aircraft in which overlapping images will be captured.

Image sensor dimensions and pixel count are values that can be used to compute point $X_L$ 522 and point $X_R$ 524 in FIG. 5. The dimensions of the image sensor are used to determine the angular distance from the centerline for the key point.

The process begins by generating images (operation 900). The process identifies a key feature on the ground in the images (operation 902). In operation 902, the key feature is found in two or more of the images. The key feature can take a number of different forms. For example, the key feature can be a road marking, an object, or a pattern laid down on the ground by a human operator.

The process measures a pixel length of the key feature in the images (operation 904). The pixel length in the key feature may be constant or can vary from image-to-image.

The process performs stereo depth triangulation with two consecutive images of the key point to determine a distance to the key point from the aircraft (operation 906). In operation 906, the stereo depth triangulation can also use the altitude measured by the aircraft.

The process transmits a location of the key feature, an identification of the key feature, a distance for the key feature, and an altitude measured for the second aircraft to the first aircraft that will also generate the images using the locations (operation 908). The process terminates thereafter.

Figure 10:
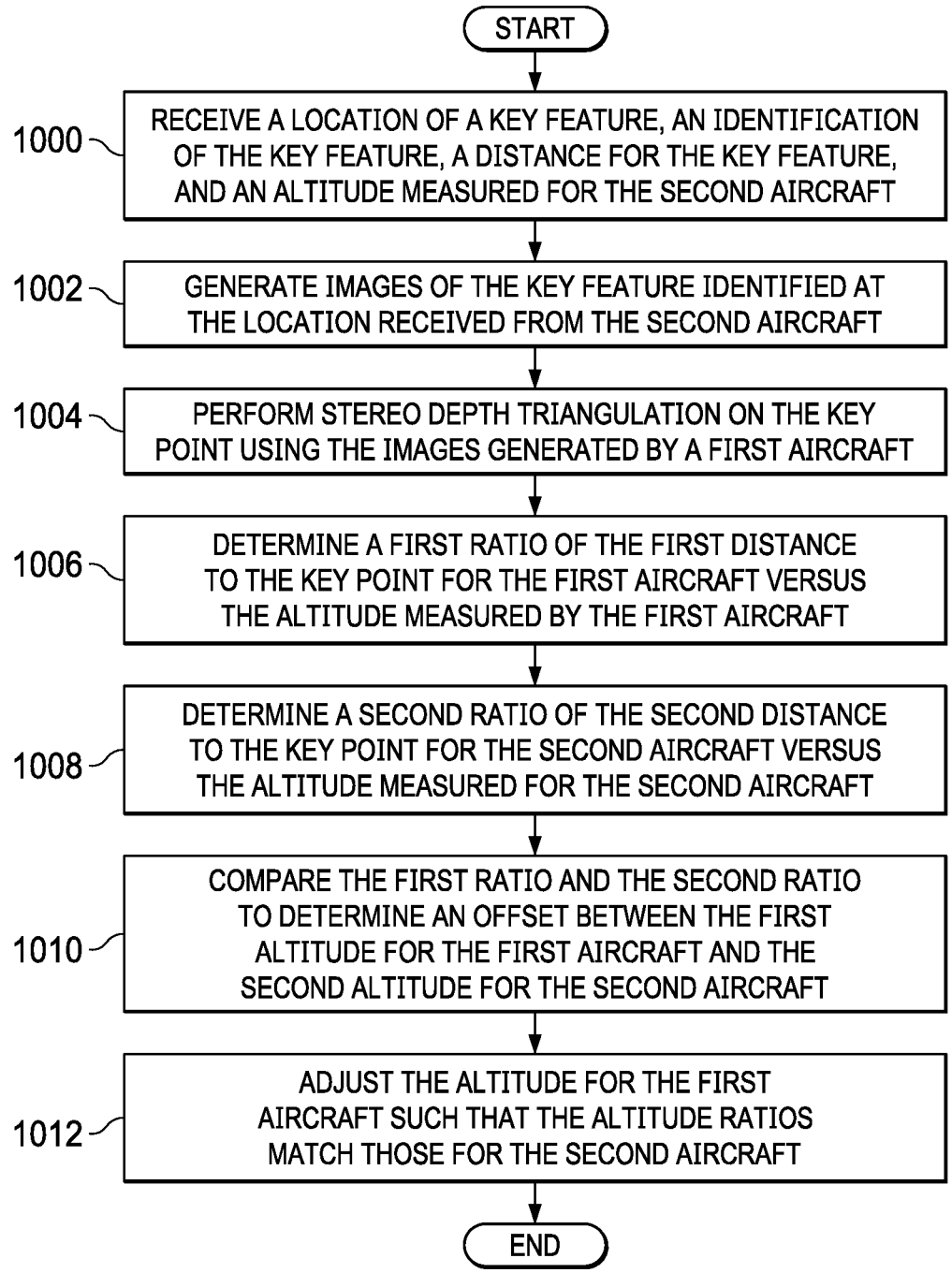
FIG. 10 is an illustration of a flowchart of a process for operating an aerial imaging system in accordance with an illustrative embodiment.

Turning now to FIG. 10, an illustration of a flowchart of a process for operating an aerial imaging system is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in first aircraft 204 in FIG. 2. For example, controller 208 in computer system 210 can be distributed such that some operations are performed in first aircraft 204.

The process begins by receiving a location of a key feature, an identification of the key feature, a distance for the key feature, and an altitude measured for a second aircraft (operation 1000). The information received from the second aircraft is used in the process for determining an offset in the altitude measured by the first aircraft. In other words, both aircraft may have the same altitude in the measurements, but the actual altitudes may be different. This information is used to determine the offset between an actual altitude of an aircraft based on a measurement of an altitude for that aircraft. In one illustrative example, the offset assumes that the measurement for the first aircraft is the correct altitude and the second aircraft has an error that should be adjusted.

The process then generates images of the key feature identified at the location received from the second aircraft (operation 1002). In operation 1002, these images can be generated when the first aircraft flies close enough to the location of the key point to generate the images of the key point. This flight to the location can be part of a predetermined flight path in one illustrative example. In another illustrative example, the first aircraft can alter the flight path to generate the images of the key point.

The process performs stereo depth triangulation on the key point using the images generated by a first aircraft (operation 1004). In operation 1004, a first distance to the key point for the first aircraft is determined from performing the stereo depth triangulation.

The process determines a first ratio of the first distance to the key point for the first aircraft versus the altitude measured by the first aircraft (operation 1006). The process determines a second ratio of the second distance to the key point for the second aircraft versus the altitude measured for the second aircraft (operation 1008). The process compares the first ratio and the second ratio to determine an offset between the first altitude for the first aircraft and the second altitude for the second aircraft (operation 1010). For example, in operation 1010, the ratio can be as follows:

$$\frac{h_b}{h_a} = \frac{i_a}{i_b}$$

Where $h_a$=number of pixels of a feature in the key point covered in drone A camera sensor; $h_b$=number of pixels of the feature in the key point covered in drone B camera sensor; $i_a$=Drone A calculated altitude; $i_b$=Drone B measured altitude. In this manner, the offset of $i_b$=Drone B measured altitude from $i_a$=Drone A calculated altitude can be determined.

The process adjusts the altitude for the first aircraft such that the altitude ratios match those for the second aircraft (operation 1012). The process terminates thereafter. As a result of this process, both aircraft had the same measured altitude. This process does not mean that the altitudes are necessarily practical, and both have the same error or inaccuracy.

Figure 11:
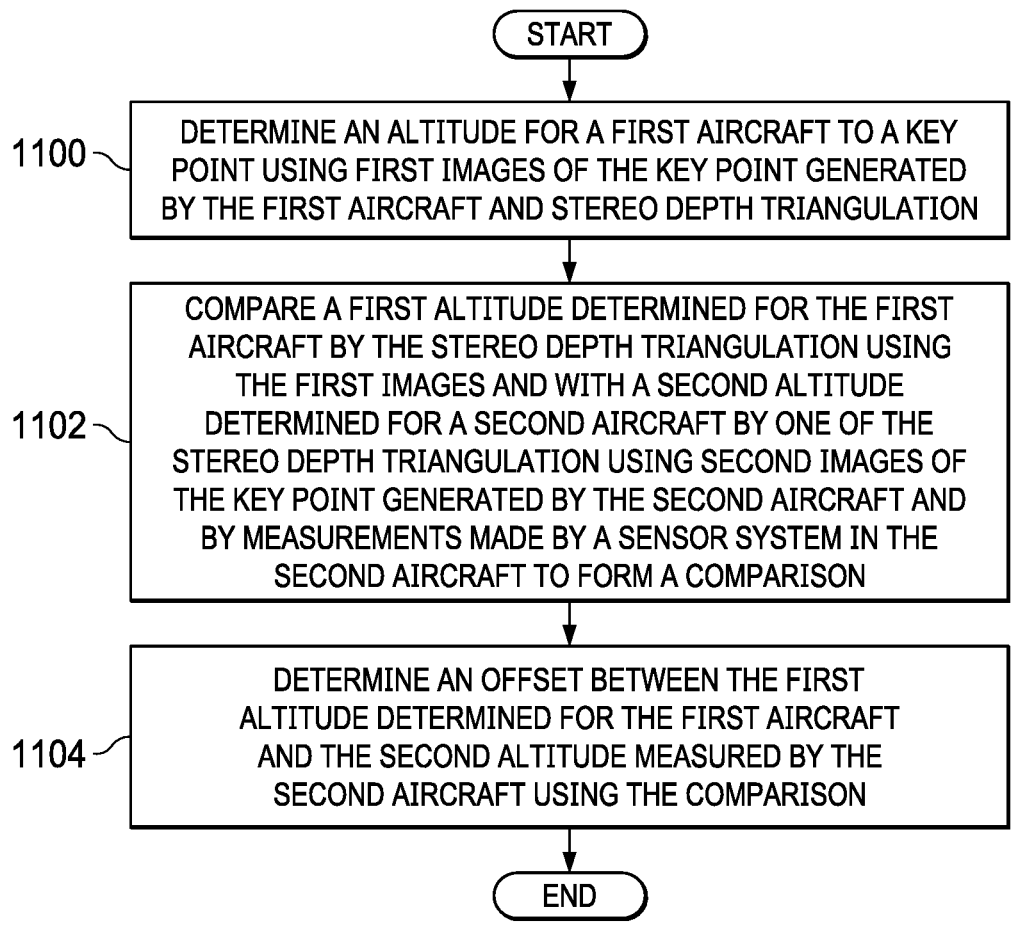
FIG. 11 is another illustration of a flowchart of a process for operating an aerial imaging system in accordance with an illustrative embodiment.

Turning next to FIG. 11, an illustration of a flowchart of a process for operating an aerial imaging system is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in controller 208 in computer system 210 in aerial imaging system 200 in FIG. 2. In this example, controller 208 in computer system 210 can be located in at least one of a first aircraft, a second aircraft, a remote location, or some other aircraft or vehicle.

The process beings by determining an altitude for a first aircraft to a key point using first images of the key point generated by the first aircraft and stereo depth triangulation (operation 1100). The process compares a first altitude determined for the first aircraft by the stereo depth triangulation using the first images and with a second altitude determined for a second aircraft by one of the stereo depth triangulation using second images of the key point generated by the second aircraft and by measurements made by a sensor system in the second aircraft to form a comparison (operation 1102).

The process determines an offset between the first altitude determined for the first aircraft and the second altitude measured by the second aircraft using the comparison (operation 1104). The process terminates thereafter.

The offset determined in operation 1104 can be used to perform a set of actions. The set of actions can be selected from at least one of adjusting altitude information for points in point clouds derived from images generated of an environment by the first aircraft and the second aircraft; controlling a mission for the first aircraft and the second aircraft; coordinating routes of the first aircraft and the second aircraft; synchronizing altitudes flown by the first aircraft and the second aircraft; synchronizing sensor systems that measure altitude in the first aircraft and the second aircraft; coordinating the flight of the first aircraft and the second aircraft in a formation; or other suitable actions.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
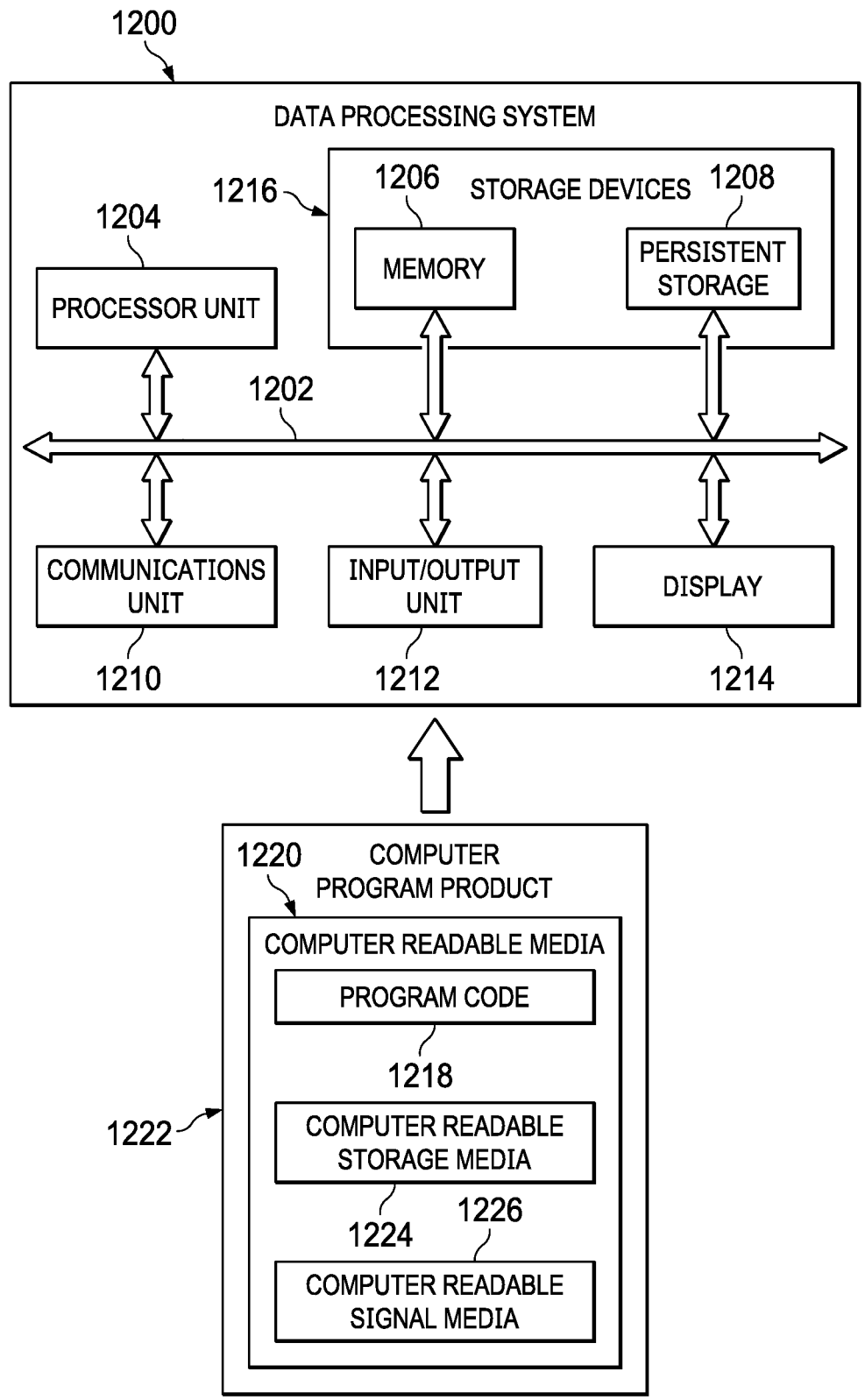
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 can be used to implement computer system 210 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 can take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 can provide a connection for user input through at least one of a keyboard, a mouse, or some other suitable input device. Further, input/output unit 1212 can send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which can be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage medium, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218. Computer readable storage media 1220, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, can be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

Thus, the illustrative examples provide a method, apparatus, system, and computer program product for operating an aerial imaging system. A first distance from a first aircraft to a key point is determined, by a computer system, using first images of the key point generated by the first aircraft during a flight of the first aircraft and stereo depth triangulation. The first distance to the key point from the first aircraft and a first altitude for the first aircraft measured by the first aircraft is compared with a second distance to the key point from a second aircraft and a second altitude for the second aircraft measured by the second aircraft, by the computer system, to form a comparison. An offset between the first altitude for the first aircraft and the second altitude measured by the second aircraft is determined, by the computer system, using the comparison, wherein the offset is used to adjust an altitude of the first aircraft.

By determining the offset, altitude adjustments can be made for at least one of the first aircraft or the second aircraft to perform various missions more accurately or with less use of processing resources. For example, with altitudes that are more closely correlated to each other, images and data sets generated between different aircraft can be processed more quickly to generate a point cloud of an object of interest. In other illustrative examples, the altitudes can be adjusted such that precision flying or other missions can be performed more accurately and with increased safety.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aerial imaging system that comprises:
   a first aircraft that comprises a first camera system;
   a second aircraft that comprises a second camera system and a sensor system;
   a computer system; and
   a controller in the computer system, wherein the controller is configured to:
      receive first images, generated from the first camera system, of a key point;
      receive second images, generated from the second camera system, of the key point;
      determine a first altitude of the first aircraft based upon the first images of the key point and a stereo depth triangulation;
      receive measurements made by the sensor system;
      determine a second altitude of the second aircraft based upon a second stereo depth triangulation based upon the second images of the key point generated by the second aircraft and by measurements made by the sensor system;
      form a comparison between the first altitude and the second altitude;
      determine, based upon the comparison, an offset between the first altitude and the second altitude;
      derive, based upon the first images and the second images, point clouds associated with an environment that comprises the key point; and
      adjust, based upon the offset, altitude information for points in point clouds.

2. The aerial imaging system of claim 1, wherein the controller is further configured to:
   transmit from the second aircraft to the first aircraft: a location of the key point, an identification of the key point, a distance for the key point, and an altitude measured for the second aircraft; and
   based upon the offset, coordinate routes of the first aircraft and the second aircraft.

3. The aerial imaging system of claim 2, wherein the controller is further configured to synchronize sensor systems that measure altitude in the first aircraft and the second aircraft.

4. The aerial imaging system of claim 1, wherein the controller is distributed in both the first aircraft and the second aircraft and is configured to identify the key point in the first images generated by the first camera system.

5. The aerial imaging system of claim 1, wherein the stereo depth triangulation based upon pixels for the key point in the first images or the second images.

6. The aerial imaging system of claim 1, wherein the first aircraft and the second aircraft are selected from at least one of: an airplane, an unmanned aerial system, an unmanned aerial vehicle, a drone, a rotorcraft, or a spacecraft.

7. The aerial imaging system of claim 1, wherein the key point is one of: an area of land, a mountain, a tower, a building, a lake, a dam, a marker, a pattern, and a VOR antennae.

8. An aerial imaging system that comprises:
   a first camera system carried by a first aircraft, wherein the first camera system is configured to generate first images during a flight of the first aircraft;
   an altitude sensor system carried by the first aircraft, wherein the altitude sensor is configured to measure a first altitude for the first aircraft;
   a second camera system carried by a second aircraft that comprises a sensor system, wherein the second camera system is configured to generate second images during a flight of the second aircraft; and
   a controller for the first aircraft, wherein the controller is configured to:
      determine a first distance from the first aircraft to a key point based upon the first images and stereo depth triangulation;
      receive, from a second aircraft, a second distance to the key point from the second aircraft and a second altitude measured for the second aircraft;
      compare the first distance to the key point from the first aircraft and first altitude with the second distance to the key point from the second aircraft and the second altitude to form a comparison;
      determine an offset between the first altitude for the first aircraft and the second altitude for the second aircraft based upon the comparison;
      transmit from the second aircraft to the first aircraft: a location of the key feature, an identification of the key feature, a distance for the key feature, and an altitude measured for the second aircraft;
      derive, based upon the first images and the second images, point clouds associated with an environment that comprises the key point; and
      based upon the offset:
         adjust an altitude of the first aircraft; or adjust altitude information for points in the point clouds.

9. The aerial imaging system of claim 8, further comprising the controller configured to:
transmit from the second aircraft to the first aircraft: a location of the key feature, an identification of the key feature, a distance for the key feature, and an altitude measured for the second aircraft; and
based upon the offset, coordinate routes of the first aircraft and the second aircraft.

10. The aerial imaging system of claim 9, wherein the controller is further configured to synchronize sensor systems that measure altitude in the first aircraft and the second aircraft.

11. The aerial imaging system of claim 8, further comprising the controller being distributed in both the first aircraft and the second aircraft and configured to identify the key point in the first images generated by the first camera system.

12. The aerial imaging system of claim 8, wherein the first distance is based upon a stereo depth triangulation based upon first pixels for the key point in the first images, and the second distance is based upon stereo depth triangulation based upon second pixels for the key point in second images.

13. The aerial imaging system of claim 8, wherein the altitude sensor system comprises at least one of a barometric sensor or a global positioning system receiver.

14. A method for operating an aerial imaging system, the method comprising:
a first aircraft generating, during a flight, first images of a key point;
a second aircraft generating second images;
determining, by a computer system, a first altitude of the first aircraft using the first images and stereo depth triangulation;
determining a second altitude for the second aircraft;
forming a comparison, by the computer system comparing, the first altitude with the second altitude;
determining, by the computer system, an offset between the first altitude and the second altitude using the comparison;
deriving point clouds from the first images and the second images;
adjusting, by the computer system using the offset, at least one of:
the first altitude or the second altitude; or
altitude information for points in point clouds.

15. The method of claim 14, further comprising the computer system:
transmitting from the second aircraft to the first aircraft: a location of the key point, an identification of the key point, a distance for the key point, and an altitude measured for the second aircraft; and
coordinating, using the offset, routes of the first aircraft and the second aircraft.

16. The method of claim 15, wherein the computer system is further configured to synchronize sensor systems that measure altitude in the first aircraft and the second aircraft.

17. The method of claim 14, further comprising the computer system:
being distributed in both the first aircraft and the second aircraft; and
identifying the key point in the first images generated by a first camera system associated with the first aircraft.

18. The method of claim 14, wherein the second altitude is determined using stereo depth triangulation performed using second images of the key point generated by the second aircraft.

19. The method of claim 14, wherein the second altitude is determined using an altitude sensor system associated with the second aircraft.

20. The method of claim 14, wherein the first aircraft and the second aircraft are selected from at least one of an airplane, an unmanned aerial system, an unmanned aerial vehicle, a drone, a rotorcraft, or a spacecraft.

21. A computer program product configured to control an aerial imaging system, wherein the computer program product comprises:
a computer-readable storage media;
receive first images, generated from a first camera system on a first aircraft, of a key point;
receive second images, generated from a second camera system on a second aircraft, of the key point;
first program code stored on the computer-readable storage media and configured to cause a computer system distributed among the first aircraft and the second aircraft to determine a first distance from the first aircraft to a key point based upon first images of the key point generated by the first aircraft during a flight of the first aircraft and stereo depth triangulation;
second program code stored on the computer-readable storage media and configured to cause the computer system to compare the first distance to the key point from the first aircraft and a first altitude for the first aircraft measured by the first aircraft with a second distance to the key point from the second aircraft and a second altitude for the second aircraft measured by the second aircraft to form a comparison; and
third program code stored on the computer-readable storage media and configured to:
cause the computer system to determine, based upon the comparison, an offset between the first altitude for the first aircraft and the second altitude measured by the second aircraft;
transmit from the second aircraft to the first aircraft: a location of the key point, an identification of the key point, a distance for the key point, and an altitude measured for the second aircraft;
based upon the offset, adjust an altitude of the first aircraft;
derive, based upon the first images and the second images, point clouds associated with an environment that comprises the key point; and
adjust, based upon the offset, altitude information for points in point clouds.

* * * * *